United States Patent
Liu et al.

(10) Patent No.: US 12,483,022 B2
(45) Date of Patent: Nov. 25, 2025

(54) THERMAL FAILURE PREDICTION MODULE AND METHOD FOR SOLID STATE CIRCUIT PROTECTION DEVICE

(71) Applicant: EATON INTELLIGENT POWER LIMITED, Dublin (IE)

(72) Inventors: Jianyang Liu, Presto, PA (US); Andrew A. Rockhill, Waukesha, WI (US); Xin Zhou, Wexford, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 238 days.

(21) Appl. No.: 18/378,842

(22) Filed: Oct. 11, 2023

(65) Prior Publication Data

US 2024/0128737 A1   Apr. 18, 2024

Related U.S. Application Data

(60) Provisional application No. 63/415,768, filed on Oct. 13, 2022.

(51) Int. Cl.
  *H02H 5/00*   (2006.01)
  *H02H 1/00*   (2006.01)
  *H02H 5/04*   (2006.01)

(52) U.S. Cl.
  CPC ......... *H02H 5/047* (2013.01); *H02H 1/0007* (2013.01)

(58) Field of Classification Search
  None
  See application file for complete search history.

(56) References Cited

U.S. PATENT DOCUMENTS

| | | | |
|---|---|---|---|
| 9,030,795 B2* | 5/2015 | Elms | H02H 5/047 361/93.8 |
| 10,312,679 B2* | 6/2019 | Okerman | H02H 1/0015 |
| 10,630,069 B2* | 4/2020 | Kennedy | H02H 3/445 |
| 2015/0054462 A1* | 2/2015 | Weidinger | H02H 5/047 320/109 |
| 2020/0350757 A1* | 11/2020 | Wu | H02H 1/0007 |

\* cited by examiner

*Primary Examiner* — Stephen W Jackson
(74) *Attorney, Agent, or Firm* — Eckert Seamans Cherin & Mellott, LLC

(57) ABSTRACT

A system and method are provided for protecting semiconductor components from thermal failure in an electronic circuit interrupter. The electronic trip unit (ETU) is configured to determine what range of current the detected current signal corresponds to, out of several ranges categorized as being either non-fault/normal, non-severe fault, and severe fault. The ETU then selects a mode of operation in which to operate based on the determined range of current. In modes of operation corresponding to a fault condition, the ETU monitors certain characteristics of the current such as magnitude and/or rate of rise, and if the aforementioned current characteristics exceed a specified threshold for a minimum interval of time, the ETU will trip the electronic interrupter. If, however, the aforementioned current characteristics fall below the specified threshold prior to the minimum interval of time elapsing, the ETU will not trip the electronic interrupter.

20 Claims, 3 Drawing Sheets

THERMAL FAILURE PREDICTION MODULE AND METHOD FOR SOLID STATE CIRCUIT PROTECTION DEVICE

CROSS REFERENCE TO RELATED APPLICATIONS

This application claims priority to U.S. Patent Application Ser. No. 63/415,768, filed Oct. 13, 2022 and entitled, "Using Electrical Information To Predict Thermal Failure In A Solid State Circuit Protection Device".

FIELD OF THE INVENTION

The disclosed concept relates generally to circuit interrupters, and in particular, to systems and methods used to predict failure of solid state circuit interrupter devices.

BACKGROUND OF THE INVENTION

Circuit interrupters, such as for example and without limitation, circuit breakers, are typically used to protect electrical circuitry from damage due to various trip conditions, including an overcurrent condition, such as an overload condition, a short circuit, or another fault condition, such as an arc fault or a ground fault. Referring to FIG. 1, circuit interrupters such as the schematically depicted circuit interrupter 1 are generally structured to be electrically connected between a power source 2 and a load 3 via a line conductor 4. Circuit interrupter 1 is a solid state circuit breaker that includes an electronic interrupter 6, which operates as a switch. The electronic interrupter 6 comprises a number of power electronic components with switching functionality, such as power semiconductor devices. Non-limiting examples of such power semiconductor devices include IGBTs (insulated gate bipolar transistors) and power MOSFETs.

The power semiconductors of the electronic interrupter 6 are configured to switch between ON and OFF states, and when the power semiconductors are switched ON such that current can flow through the electronic interrupter 6 from the power source 2 to the load 3, the electronic interrupter 6 is also said to be switched ON. However, if any of the power semiconductors are switched OFF such that current is prevented from flowing through the electronic interrupter 6 from the power source 2 to the load 3, then the electronic interrupter 6 is said to be switched OFF. Typically, solid state circuit interrupters 1 further include a current sensor 8 or other type of sensor structured to detect a number of fault conditions in the line conductor 4, and a trip condition monitoring mechanism, such as an electronic trip unit (ETU) 10. The electronic interrupter 6 is configured to remain switched ON under normal operating conditions, and the ETU 10 is configured to switch the electronic interrupter 6 OFF upon detecting a fault condition with the current sensor 8.

Under fault current conditions, limiting the interval of time during which current can flow through the electronic interrupter 6 is important, as the semiconductor devices of the electronic interrupter 6 are not intended to withstand the sustained continuous flow of any current that exceeds the current rating of the semiconductor devices. Semiconductor devices are the most critical components of the electronic interrupter 6, and thermal failure in a semiconductor device is destructive to the electronic interrupter 6 and to the overall circuit interrupter 1. Typically, a number of temperature sensors 12 are used to directly measure the temperature of the semiconductor devices in an electronic interrupter 6, in order to determine if the semiconductor devices are trending toward thermal failure. However, there can be a lag between the semiconductor device reaching a particular temperature and the temperature sensor 12 registering that particular temperature, and it will be appreciated that fault conditions can worsen significantly within tens or hundreds of microseconds once the current exceeds the rated current level by a significant enough factor, such as, for example and without limitation, when the current exceeds 6 times the rated current level. For the sake of brevity, a current level exceeding 6 times the rated current level will be referred to hereinafter as a "severe" fault level of current, in order to differentiate between less severe fault conditions and more severe fault conditions, as detailed further later herein. Once the current has reach severe fault levels, a typical temperature sensor 12 cannot detect changes indicative of impending thermal failure quickly enough to enable the ETU 10 to trip the electronic interrupter 6, i.e. switch the electronic interrupter 6 OFF, before the semiconductors sustain damage.

There is thus room for improvement in systems and methods used to predict failure of solid state circuit interrupter devices.

SUMMARY OF THE INVENTION

These needs, and others, are met by embodiments of the disclosed concept in which characteristics of the detected current signal in a solid state circuit interrupter are used to predict thermal failure.

In accordance with one aspect of the disclosed concept, a system for protecting semiconductor components from thermal failure in an electronic interrupter of a solid state circuit interrupter comprises: a current sensor configured to sense current flowing through the electronic interrupter and an electronic trip unit (ETU) that includes a thermal failure prediction module, the ETU being configured to receive a detected current signal from the current sensor and to trip the electronic interrupter to an OFF state from an ON state. The ETU is configured to determine which range of current the detected current signal corresponds to, out of a plurality of ranges of current. The ETU is configured to selectively operate in one mode of operation out of a plurality of modes of operation based on the determined range of current. A first mode of the plurality of modes of operation is a Di/Dt protection mode. In the Di/Dt protection mode, the ETU is configured to trip the electronic interrupter to the OFF state if: the detected current signal corresponds to a first severe fault level range of current, a rate of rise of the detected current signal exceeds a predetermined safe rate of rise threshold, and the detected current signal remains within the first severe fault level range of current for longer than a predetermined Di/Dt protection time delay.

In accordance with another aspect of the disclosed concept, a method for preventing thermal failure of semiconductor components in an electronic interrupter of a solid state circuit interrupter comprises: providing an electronic trip unit (ETU) with a thermal failure prediction module for the solid state circuit interrupter; detecting current flowing through the electronic interrupter with a current sensor and transmitting a detected current signal from the current sensor to the ETU; determining, with the ETU, determining, with the ETU, which range of current the detected current signal corresponds to, out of a plurality of ranges of current; and enabling, with the ETU, a selected mode of operation in which to operate the ETU, the selected mode of operation corresponding to the determined range of current. The selected mode of operation is one mode of a plurality of modes of operation, and a first mode of the plurality of modes of operation is a Di/Dt protection mode. When the selected mode of operation is the Di/Dt protection mode, then the unique range of current is a first severe fault level range of current, and the method further comprises: determining with the ETU whether a rate of rise of the detected current signal exceeds a predetermined safe rate of rise threshold; and tripping the electronic interrupter to the OFF state with the ETU if the rate of rise exceeds a predetermined safe rate of rise threshold and if the detected current signal remains within the first severe fault level range of current for a time period exceeding a predetermined Di/Dt protection time delay.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
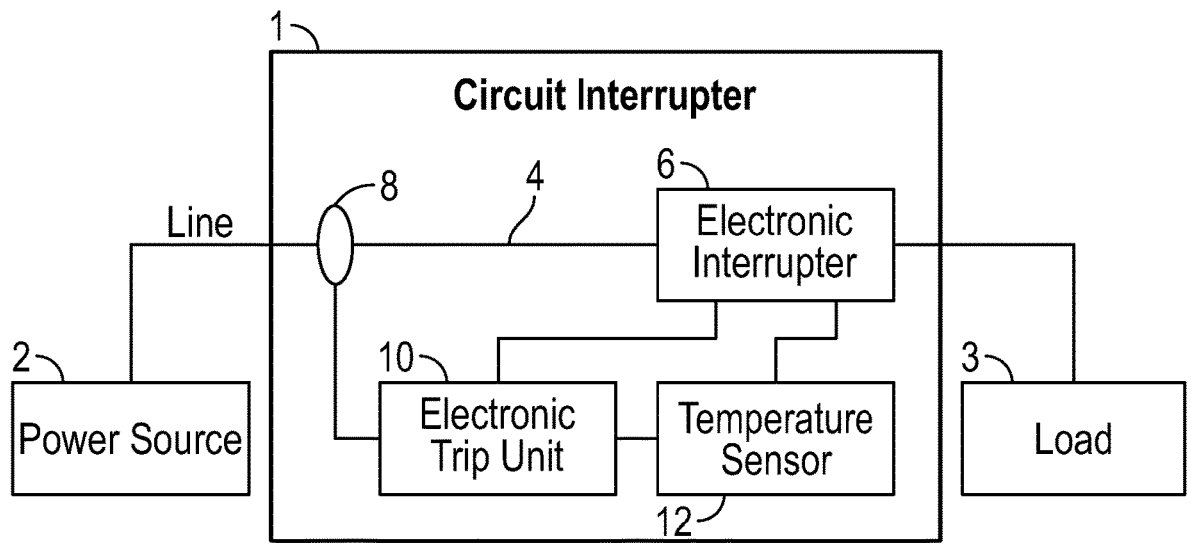
FIG. 1 is a schematic diagram of a prior art solid state circuit interrupter with an electronic interrupter and a temperature sensor.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "processing unit" or "processor" shall mean a programmable analog and/or digital device that can store, retrieve, and process data; a microprocessor; a microcontroller; a microcomputer; a central processing unit; or any suitable processing device or apparatus.

Figure 2:
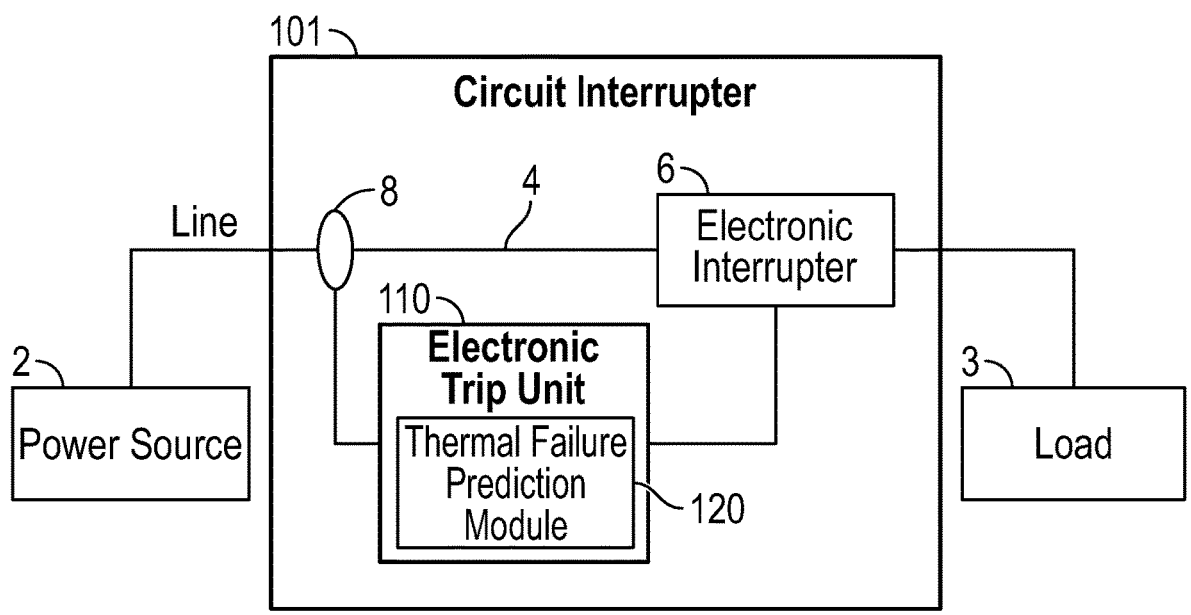
FIG. 2 is a schematic diagram of an improved solid state circuit interrupter with an improved electronic trip unit that includes a thermal failure prediction module instead of a temperature sensor, in accordance with an example embodiment of the disclosed concept.

Disclosed herein is an improved system for protecting semiconductor components from thermal failure in an electronic interrupter of a solid state circuit interrupter, implemented by an improved electronic trip unit (ETU) 110 that improves outcomes in severe fault level current conditions, relative to systems that utilize direct temperature measurement devices. FIG. 2 depicts an improved circuit interrupter 101 that includes the improved ETU 110, in accordance with exemplary embodiments of the disclosed concept. The circuit interrupter 101 is a solid state circuit breaker. The circuit interrupter 101 includes many of the same components as the circuit interrupter 1 shown in FIG. 1, and the ETU 110 can implement the same functions as the ETU 10 shown in FIG. 1, but the ETU 110 additionally includes a thermal failure prediction module 120. The thermal failure prediction module 120 renders a temperature sensor unnecessary in the circuit interrupter 101 for the purpose of predicting thermal failure.

Specifically, at severe fault levels of current, the disclosed thermal failure prediction module 120 enables the ETU 110 to detect changes in current and voltage indicative of potential thermal failure significantly faster than direct temperature sensors can, thus enabling the disclosed ETU 110 to more effectively prevent thermal failure of the semiconductor devices of the electronic interrupter 6 that can occur at severe fault levels of current. Preventing thermal failure of the semiconductor devices extends the life of the electronic interrupter 6, and by extension, the life of any equipment upstream of the circuit interrupter 1.

Figure 3:
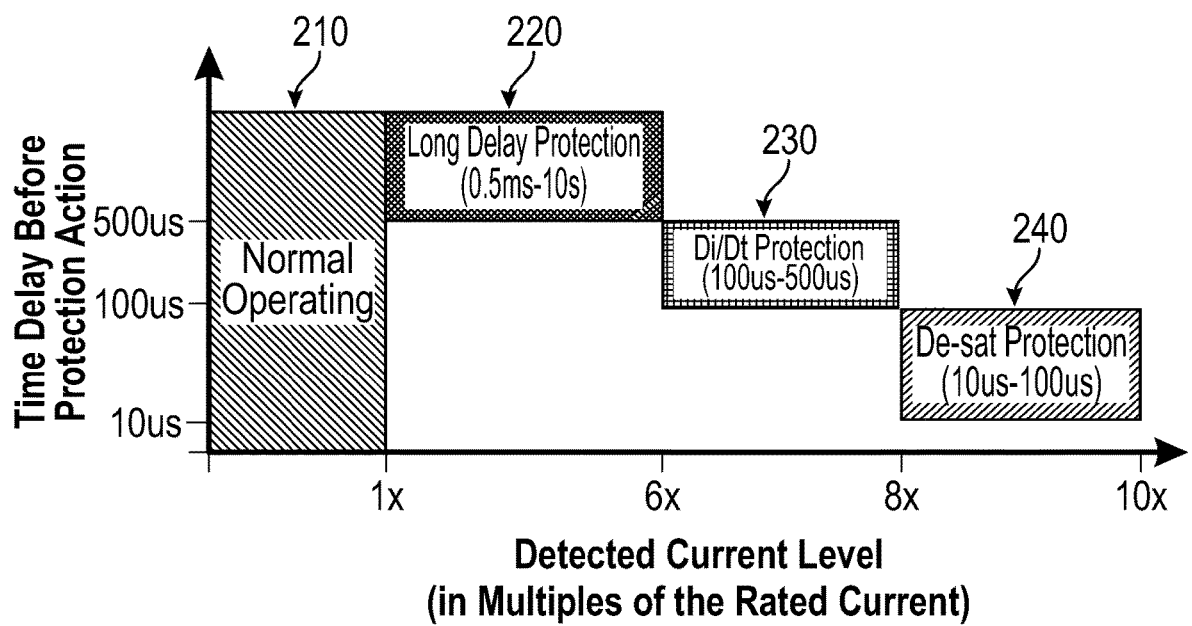
FIG. 3 is a bar graph depicting the current levels that are detected and the time delays that are implemented within various modes of operation of the thermal failure prediction module shown in FIG. 2, in accordance with an example embodiment of the disclosed concept.

FIG. 3 is a bar graph that denotes various protection modes that can be enabled in the ETU 110 by the thermal failure prediction module 120 depending on the detected current level, in accordance with exemplary embodiments of the disclosed concept. In FIG. 3, the detected current level denoted on the x-axis refers to the current through the line conductor 4 sensed by the current sensor 8, although the current can be measured elsewhere in the circuit interrupter 101 without departing from the scope of the disclosed concept. As shown in FIG. 3, when the detected current is in a first range 210 wherein the current is either at or below the rated current level for the circuit interrupter 1 (i.e. up to one time, 1×, the rated current level), the ETU 110 operates in a Normal Operating mode wherein the ETU 110 enables the electronic interrupter 6 to remain powered ON.

When the detected current level reaches a second range 220 wherein the rated current is between 1 and 6 times the rated current level (i.e. 1× to 6× the rated current), then the ETU 110 will enter into a Long Delay Protection mode. In the Long Delay Protection mode, the ETU 110 will initiate a trip to switch the electronic interrupter 6 OFF if the detected current remains at a level between 1 and 6 times the rated current level for at least 500 microseconds (μs), i.e. 0.5 milliseconds (ms). It is expected that a user would set the ETU 110 to wait as long as 10 seconds before tripping the electronic interrupter 6 in Long Delay Protection mode, depending on the specific circumstances in which the electronic interrupter 6 is being used. The Long Delay Protection mode is intended to provide time for a moderately high current level to decrease to a level within the normal operating range without tripping the electronic interrupter 6, since inductive conditions in the circuit breaker 1 can produce inrush current that only temporarily increases the detected current to a level in excess of the rated current level. Because levels of current corresponding to the Long Delay Protection mode often decrease on their own, these levels of current can be thought of as non-severe levels of fault current. It is noted that the conditions that trigger the Long Delay Protection mode are also often referred to as overload conditions.

Continuing to refer to FIG. 3, the innovative aspects of the disclosed ETU 110 and thermal failure prediction module 120 become apparent once the detected current level reaches a third range 230 wherein the detected current is between 6 and 8 times the rated current level (i.e. 6× to 8× the rated current). In this third range 230 for the detected current level, the ETU 110 will enter into a Di/Dt Protection mode, wherein the ETU 110 will initiate a trip to switch the electronic interrupter 6 OFF if the rate of rise of the detected current exceeds a predetermined safe threshold for the rate of rise, and if the detected current remains at a level between 6 and 8 times the rated current level for at least 100 μs, i.e. 0.1 ms. One non-limiting example of a suggested rate of rise threshold for the Di/Dt protection mode is 60 A/μs. It is expected that a user would set the ETU 110 to wait as long as 500 us before tripping the electronic interrupter 6 in Di/Dt Protection mode, depending on the specific circumstances in which the electronic interrupter 6 is being used.

Still referring to FIG. 3, if the detected current level reaches a fourth range 240 wherein the detected current is between 8 and 10 times the rated current level (i.e. 8× to 10× the rated current), then the ETU 110 will enter into a Desaturation Protection ("De-sat Protection") mode. In the De-sat Protection mode, the ETU 110 will initiate a trip to switch the electronic interrupter 6 OFF if the rated current remains at a level between 8 and 10 times the rated current level for at least 10 μs. It is expected that a user would set the ETU 10 to wait as long as 100 us before tripping the electronic interrupter 6 in De-sat Protection mode, depending on the specific circumstances in which the electronic interrupter 6 is being used. The De-sat Protection mode is intended to prevent the semiconductor devices of the electronic interrupter 6 from entering into or remaining within a de-saturation state, in order to prevent permanent damage to the semiconductor devices.

The current rating ranges and time delays displayed for each operating mode in FIG. 3 are provided as non-limiting illustrative examples of the current rating ranges and time delays that can be used for each operating mode, and it is noted that the current rating ranges and time delays used for each operating mode can be adjusted from those displayed in FIG. 3 without departing from the scope of the disclosed concept. In exemplary embodiments of the disclosed concept, the disclosed ETU 110 is configured to enable the current rating ranges and time delays for each operating mode to be variable, so that a user can adjust the settings for each operating mode of the ETU 110 depending on the specific context in which the circuit interrupter 1 is to be used. In addition, it is noted that further differentiation can be made between trip conditions within each mode depicted in FIG. 3, in order to account for additional conditions that can occur within each current range. For example and without limitation, different time delays can be instituted for tripping the electronic interrupter 6 in the Di/Dt protection mode depending on whether the circuit interrupter 1 is in an overload condition or a short circuit condition.

In addition to monitoring the current through the circuit interrupter 1, the ETU 110 can be configured to additionally monitor the voltage across the semiconductor devices in the electronic interrupter 6. Monitoring the voltage across the semiconductor devices is particularly important in order to prevent or quickly end de-saturation in the semiconductor devices. Semiconductor devices are more fragile than traditional circuit breaker components, and the ability of the proposed innovation to detect changes on the scale of microseconds (μs) is much faster and more reliable than the traditional direct temperature measurement approach typically implemented in solid state circuit breakers. In addition, using current and voltage information provides a more nuanced picture of any changes in the state of the semiconductors than a temperature reading does.

Figure 4:
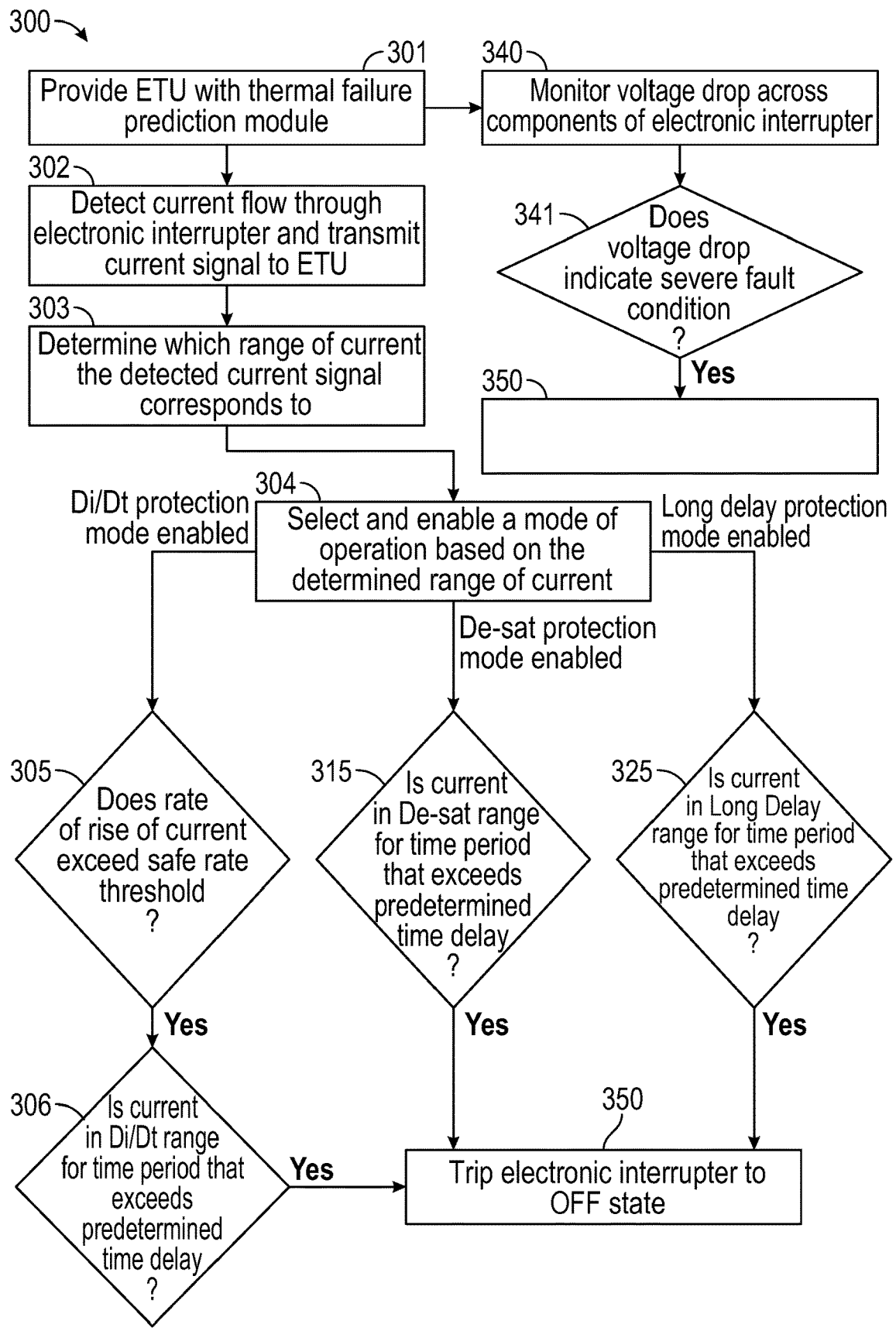
FIG. 4 is a flow chart of a method for preventing thermal failure of semiconductor components in an electronic interrupter of a solid state circuit interrupter, in accordance with an example embodiment of the disclosed concept.

FIG. 4 is a flowchart of a method 300 for preventing thermal failure of semiconductor components in an electronic interrupter of a solid state circuit interrupter, in accordance with an example embodiment of the disclosed concept. The method of FIG. 4 may be employed, for example, with the components of the solid state circuit interrupter 101 shown in FIG. 2 and is described in conjunction with interrupter 101 shown in FIG. 2. However, it will be appreciated that the method may be employed in other devices as well without departing from the scope of the disclosed concept. The method begins at step 301 where the ETU 110 with thermal failure prediction module 120 is provided. At step 302, current flowing through the electronic interrupter 6 is detected with the current sensor 8 and the detected current signal is transmitted from the current sensor 8 to the ETU 110. At step 303, the ETU 110 determines which range of current the detected current signal corresponds to, out of a plurality of ranges of current. For example and without limitation, the ETU 110 can determine which of the current ranges 210, 220, 230, or 240 shown in FIG. 3 the detected current signal corresponds to.

At step 304, the ETU 110 selects and enables a mode of operation in which to operate, with the selected mode of operation corresponding to the range of current determined at step 303. Prior to describing the subsequent steps, it is noted that the decision steps shown in FIG. 4 (i.e. steps 305, 306, 315, 325, and 341) are only depicted as including a "yes" answer/decision for the sake of illustrative clarity. A general description of the progression of actions that can take place if the decision steps yield a "no" answer is provided later herein, after all of the steps are described.

If the selected mode of operation is the Di/Dt Protection mode (for example, due to the detected current being in the range 230), then the method proceeds to step 305, where the ETU 110 determines if the rate of rise of the detected current signal exceeds a predetermined safe rate of rise threshold. If the rate of rise of the detected current signal does exceed the predetermined safe rate of rise threshold, then the method proceeds to step 306. It will be appreciated that, if the ETU 110 is operating in the Di/Dt Protection mode, then the detected current signal was determined at step 303 to be within a severe fault level range. At step 306, the ETU 110 monitors how long the current remains within the fault level range. If the current remains within the fault level range for a period of time that exceeds a predetermined Di/Dt protection time delay, then the method proceeds to step 350, where the ETU 110 trips the electronic interrupter 6 to the OFF state.

If the mode of operation selected at step 304 is the De-sat Protection mode (for example, due to the detected current being in the range 240), then the method proceeds from step 304 to step 315. It will be appreciated that, if the ETU 110 is operating in the De-sat Protection mode, then the detected current signal was determined at step 303 to be within a severe fault level range. At step 315, the ETU 110 monitors how long the detected current signal remains within the fault level range. If the current remains within the fault level range for a period of time that exceeds a predetermined De-sat protection time delay, then the method proceeds to step 350, where the ETU 110 trips the electronic interrupter 6 to the OFF state.

If the mode of operation selected at step 304 is the Long Delay Protection mode (for example, due to the detected current being in the range 220), then the method proceeds from step 304 to step 325. It will be appreciated that, if the ETU 110 is operating in the De-sat Protection mode, then the detected current signal was determined at step 303 to be within a non-severe fault level range. At step 325, the ETU 110 monitors how long the detected current signal remains within the fault level range. If the current remains within the fault level range for a period of time that exceeds a predetermined long delay protection time delay, then the method proceeds to step 350, where the ETU 110 trips the electronic interrupter 6 to the OFF state.

In addition, it will be appreciated that the voltage drop across the components of the electronic interrupter 6 can simultaneously be monitored at step 340 while the other steps detailed above are performed, and that the ETU 110 can take said voltage drop(s) into account at any time in determining whether or when to trip the electronic interrupter 6 to an OFF state. For example, after step 301, the method can simultaneously proceed to step 340 while proceeding to step 302. After step 340, the method can proceed to step 342, where the ETU 110 can determine if the voltage drop is indicative of a severe fault condition. The voltage drop is determined at step 342 to be indicative of a severe fault condition, then the method proceeds to step 350, where the ETU 110 trips the electronic interrupter 6 to the OFF state.

A general description of the progression of actions that can take place if the decision steps yield a "no" answer is now provided. If the answer at step 341 is "no", the method can continually perform step 341 until the answer is "yes". If the answer at step 325 is "no", the method can return to step 303, as this signifies that the current has either fallen below or risen above the Long Delay Protection range 220. If the answer at step 315 is "no", the method can return to step 303, as this signifies that the current has fallen below the De-sat Protection range 240. If the answer at step 306 is "no", the method can return to step 303, as this signifies that the current has either fallen below or risen above the Di/Dt Protection range 220. Different users may configure the ETU 110 to take different actions if the answer at step 305 is "no". In a first non-limiting example, the ETU 110 can be configured to return to step 303, as the user may not consider the elevated current level to be problematic for that user's particular purpose. In a second non-limiting example, the ETU 110 can be configured to proceed to step 306 anyway, as the user may not want to expose the loads connected to the circuit interrupter 101 to the elevated current despite the rate of rise not exceeding the rate of rise threshold.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof

What is claimed is:

1. A system for protecting semiconductor components from thermal failure in an electronic interrupter of a solid state circuit interrupter, the system comprising:
a current sensor configured to sense current flowing through the electronic interrupter; and
an electronic trip unit, ETU, that includes a thermal failure prediction module and is configured to trip the electronic interrupter to an OFF state from an ON state,
wherein the ETU is configured to receive a detected current signal from the current sensor,
wherein the ETU is configured to determine which range of current the detected current signal corresponds to, out of a plurality of ranges of current,
wherein the ETU is configured to selectively operate in one mode of operation out of a plurality of modes of operation based on the determined range of current, and
wherein a first mode of the plurality of modes of operation is a Di/Dt protection mode,
wherein, in the Di/Dt protection mode, the ETU is configured to trip the electronic interrupter to the OFF state if:
the detected current signal corresponds to a first severe fault level range of current,
a rate of rise of the detected current signal exceeds a predetermined safe rate of rise threshold, and
the detected current signal remains within the first severe fault level range of current for longer than a predetermined Di/Dt protection time delay.

2. The system of claim 1,
wherein a minimum value of current in the first severe fault level range of current is six times a rated current level for the solid state circuit interrupter, and
wherein a maximum value of current in the first severe fault level range of current is eight times the rated current level for the solid state circuit interrupter.

3. The system of claim 2,
wherein the predetermined Di/Dt protection time delay is between 100 microseconds and 500 microseconds.

4. The system of claim 1,
wherein the predetermined safe rate of rise threshold is 60 amps per microsecond.

5. The system of claim 1,
wherein a second mode of the plurality of modes of operation is a desaturation protection mode,
wherein, in the desaturation protection mode, the ETU is configured to trip the electronic interrupter to the OFF state if:
the detected current signal corresponds to a second severe fault level range of current, and
the detected current signal remains within the second severe fault level range of current for longer than a predetermined desaturation protection time delay.

6. The system of claim 5,
wherein the ETU is configured to additionally monitor a voltage drop across the semiconductor components and determine whether or not to trip the electronic interrupter to the OFF state based on the voltage drop.

7. The system of claim 5,
wherein a minimum value of current in the second severe fault level range of current is eight times a rated current level for the solid state circuit interrupter, and
wherein a maximum value of current in the second severe fault level range of current is ten times the rated current level for the solid state circuit interrupter.

8. The system of claim 7,
wherein the predetermined desaturation protection time delay is between 10 microseconds and 100 microseconds.

9. The system of claim 5,
wherein a third mode of the plurality of modes of operation is a long delay protection mode,
wherein, in the long delay protection mode, the ETU is configured to trip the electronic interrupter to the OFF state if:
the detected current signal corresponds to a first non-severe fault level range of current, and
the detected current signal remains within the first non-severe fault level range of current for longer than a predetermined long delay protection time delay.

10. The system of claim 9,
wherein a minimum value of current in the first non-severe fault level range of current is the rated current level for the solid state circuit interrupter,
wherein a maximum value of current in the first non-severe fault level range of current is six times the rated current level for the solid state circuit interrupter, and
wherein the predetermined long delay protection time delay is between 0.5 milliseconds and 10 seconds.

11. A method for preventing thermal failure of semiconductor components in an electronic interrupter of a solid state circuit interrupter, the method comprising:
providing an electronic trip unit, ETU, with a thermal failure prediction module for the solid state circuit interrupter;
detecting current flowing through the electronic interrupter with a current sensor and transmitting a detected current signal from the current sensor to the ETU;
determining, with the ETU, which range of current the detected current signal corresponds to, out of a plurality of ranges of current; and
enabling, with the ETU, a selected mode of operation in which to operate the ETU, the selected mode of operation corresponding to the determined range of current,
wherein the selected mode of operation is one mode of a plurality of modes of operation,
wherein a first mode of the plurality of modes of operation is a Di/Dt protection mode,
wherein, when the selected mode of operation is the Di/Dt protection mode, then the unique range of current is a first severe fault level range of current, and the method further comprises:
determining with the ETU whether a rate of rise of the detected current signal exceeds a predetermined safe rate of rise threshold; and
tripping the electronic interrupter to the OFF state with the ETU if the rate of rise exceeds a predetermined safe rate of rise threshold and if the detected current signal remains within the first severe fault level range of current for a time period exceeding a predetermined Di/Dt protection time delay.

12. The method of claim 11,
wherein a minimum value of current in the first severe fault level range of current is six times a rated current level for the solid state circuit interrupter, and
wherein a maximum value of current in the first severe fault level range of current is eight times the rated current level for the solid state circuit interrupter.

13. The method of claim 12,
wherein the predetermined Di/Dt protection time delay is between 100 microseconds and 500 microseconds.

14. The method of claim 11,
wherein the predetermined safe rate of rise threshold is 60 amps per microsecond.

15. The method of claim 11,
wherein a second mode of the plurality of modes of operation is a desaturation protection mode,
wherein, if the selected mode of operation is the desaturation protection mode, then the unique range of current is a second severe fault level range of current, and the method further comprises:
tripping the electronic interrupter to the OFF state with the ETU if the detected current signal remains within the second severe fault level range of current for a time period exceeding a predetermined desaturation protection time delay.

16. The method of claim 15, further comprising:
monitoring a voltage drop across the semiconductor components with the ETU; and
determining whether or not to trip the electronic interrupter to the OFF state based on the voltage drop.

17. The method of claim 15,
wherein a minimum value of current in the second severe fault level range of current is eight times a rated current level for the solid state circuit interrupter, and
wherein a maximum value of current in the second severe fault level range of current is ten times the rated current level for the solid state circuit interrupter.

18. The method of claim 17,
wherein the predetermined desaturation protection time delay is between 10 microseconds and 100 microseconds.

19. The method of claim 15,
wherein a third mode of the plurality of modes of operation is a long delay protection mode,
wherein, if the selected mode of operation is the long delay protection mode, then the unique range of current is a first non-severe fault level range of current, and the method further comprises:
tripping the electronic interrupter to the OFF state with the ETU if the detected current signal remains within the first non-severe fault level range of current for a time period exceeding a predetermined long delay protection time delay.

20. The method of claim 19,
wherein a minimum value of current in the first non-severe fault level range of current is the rated current level for the solid state circuit interrupter,
wherein a maximum value of current in the first non-severe fault level range of current is six times the rated current level for the solid state circuit interrupter, and
wherein the predetermined long delay protection time delay is between 0.5 milliseconds and 10 seconds.

* * * * *